March 18, 1958     M. L. SKYRUD     2,827,302
PALLET TRUCKS
Filed Sept. 12, 1956
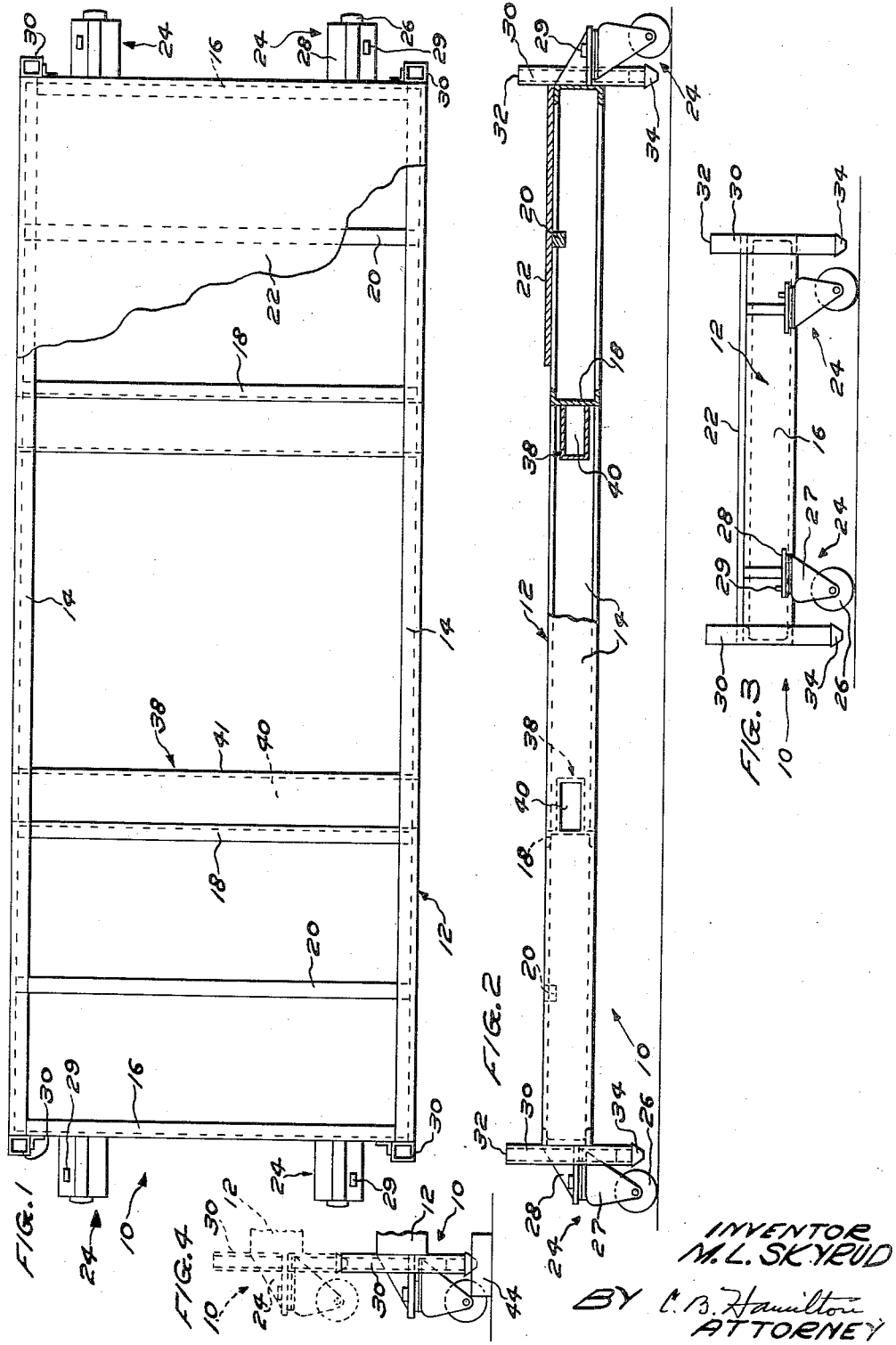
INVENTOR
M. L. SKYRUD
BY C. B. Hamilton
ATTORNEY

United States Patent Office 2,827,302
Patented Mar. 18, 1958

2,827,302

PALLET TRUCKS

Milton L. Skyrud, Western Springs, Ill., assignor to Western Electric Company, Incorporated, New York, N. Y., a corporation of New York Application September 12, 1956, Serial No. 609,418

1 Claim. (Cl. 280—33.99)

This invention relates to pallet trucks for movably or stationarily supporting a load and more particularly to pallet trucks capable of being stacked on one another in either loaded or empty condition.

An object of the invention is to provide pallet trucks for movably supporting loads and capable of being stacked to support the loads in tiers.

Another object of the invention is to provide a pallet having spaced tubular guideways for receiving the fork of a lift truck therein to prevent tilting of the pallet as it is being raised and lowered.

A truck illustrating certain features of the invention may include a framework forming a platform for supporting a load and having casters for stationarily and movably supporting the platform and the load thereon. At each corner the platform has posts which extend above and below the platform and have seats on the upper and lower ends thereof which interfit with the seats on posts of other trucks, and the platform has a pair of horizontal tubular guideways extending laterally therethrough intermediate the ends thereof for receiving the fork of a lift truck whereby the trucks may be raised without tilting and stacked upon one another with the platforms and the loads thereon supported in tiers.

Other objects and advantages of the invention will become apparent by reference to the following detailed description and the accompanying drawings illustrating a preferred embodiment thereof, in which Fig. 1 is a top plan view of the pallet truck;

Fig. 2 is a side elevational view of the pallet truck shown in Fig. 1 with portions broken away and shown in section;

Fig. 3 is an end view of the pallet truck; and

Fig. 4 is a fragmentary side elevational view of an end portion of the pallet truck shown supported on a block and showing in dotted lines a portion of a second pallet truck stacked thereon.

Referring to the drawings the pallet truck 10 comprises an elongated rectangular pallet or platform 12 made from a metal frame including a pair of longitudinal side frames 14 bonded tto the ends of a plurality of end frames 16 and intermediate cross frames 18, 20. As shown herein the side frames 14, and the end and the cross frames 16 and 18 are channel irons, and the cross members 20 are bars, all of which are welded to one another with their upper surfaces in a plane to form a strong and rigid platform for supporting strips or sheets of steel thereon. If desired a cover sheet 22 may be welded to the top of the platform to support other forms of load thereon.

Roller means 24 are provided for supporting the platform and the load thereon in a stationary position or for movement from one position to another. The roller means are in the form of locking type casters having wheels 26 rotatably supported in brackets 27 which are swivelly mounted on supporting brackets 28 welded to the end frame 16 of the platform. The casters may be locked with the wheels parallel to the side frames 14 by actuating a locking lever indicated at 29.

Vertically disposed tubular posts or stacking members 30 are welded or otherwise secured to the ends of the platform 12 at each corner thereof and these posts extend predetermined distances above and below the platform. The open upper ends of the tubular posts 30 form seats 32, and inserts 34 secured to the lower ends of the posts 30 have sloping or converging surfaces forming reduced lower ends or seats 34 which are complementary to and are adapted to fit into the upper seats 32 of the posts of other trucks 10 and be supported thereon whereby the loaded trucks may be stacked on one another with the platforms and loads in spaced relation to one another.

The truck 10 is provided with a pair of horizontal tubular members 38 forming guideways 40 extending laterally through the platform 12 for telescopingly receiving therein a lifting fork of a lift truck from either side of the platform 12 for lifting the pallet trucks 10 to stack them. The tubular frames 38 are formed by the cross frames 18 and U-shaped cross members 41 which are welded thereto and extend between and are welded to the side frames 14. Rectangular apertures cut in the side frames 14 form the open ends of the guideways 40 which are spaced equi-distant from the ends of the platform to insure proper balance of the truck and load when lifted.

The casters 24 are spaced apart on the pallet truck 10 a distance sufficient to permit the platform of an electric platform truck to be moved therebetween under the end frame of a loaded pallet truck 10 and then raise the end thereof after the casters 24 at the opposite end of the truck have been locked, and the pallet truck 10 may then be moved from one position to another. A plurality of the pallet trucks 10 may be moved to a loading station, as for example, adjacent the freight car, and each loaded with a stack of steel sheets and then moved to a predetermined station adjacent the apparatus for fabricating the sheets. One of the loaded trucks 10 may then be raised by a lift truck and lowered in a predetermined position with the posts 30 resting on blocks 44 and with the casters supported above the floor to take the weight off of the casters, after which successive loaded trucks 10 may be raised and stacked thereon in tiers to form a rack for supporting the loads of steel sheets. The tubular posts 30 of the trucks 10 thus form vertical columns for supporting the platforms 12 and the loads thereon in vertically spaced relation to each other with the loads accessible for convenient removal. After the sheets of steel have been removed from the uppermost pallet truck 10 of the stack the empty pallet truck may be lifted from the stack and placed on the floor on its casters and be readily pushed to another position.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

A pallet truck comprising a pair of parallel longitudinal side frame members each having a pair of apertures therein intermediate its ends, a plurality of cross frame members including end frame members interconnecting the longitudinal frame members in spaced relation to each other, a plate secured to and cooperable with the top of the longitudinal and the cross frame members to form a platform for supporting a load thereon, a pair of tubular cross members interconnecting the longitudinal members in alignment with the apertures therein to form guideways for telescopingly receiving the fork of a lift truck for lifting the pallet truck, a pair of casters mounted on the outside of the end frame members of said platform for supporting the platform for movement, and vertical tubular supporting members mounted on the outside of the end frame members adjacent to the corners of said platform and having portions extending above and below said platform and provided with interfitting seats on the ends thereof for receiving the supporting members of other pallet trucks in superposed relation to support the pallet trucks in a stack with the platforms in spaced relation to each other and with the casters disposed beyond the ends of the platforms.

References Cited in the file of this patent

UNITED STATES PATENTS

| | | |
|---|---|---|
| 2,462,096 | Hamilton | Feb. 22, 1949 |
| 2,685,398 | King | Aug. 3, 1954 |

FOREIGN PATENTS

| | | |
|---|---|---|
| 639,573 | Great Britain | June 28, 1950 |
| 727,568 | Great Britain | Apr. 6, 1955 |